United States Patent
Brockington et al.

(10) Patent No.: US 6,427,715 B1
(45) Date of Patent: Aug. 6, 2002

(54) RV HOLDING TANK CONNECTOR AND METHOD

(75) Inventors: William T. Brockington, Kernersville; Anthony D. Moore, Summerfield, both of NC (US)

(73) Assignee: Camco Manufacturing, Inc., Greensboro, NC (US)

( * ) Notice: Subject to any disclaimer, the term of this patent is extended or adjusted under 35 U.S.C. 154(b) by 0 days.

(21) Appl. No.: 09/924,861

(22) Filed: Aug. 9, 2001

(51) Int. Cl.[7] .......................... B08B 3/04; B08B 9/027; F16L 45/00
(52) U.S. Cl. .................... 137/239; 137/15.05; 137/240; 137/899
(58) Field of Search ................................. 137/239, 240, 137/355.16, 899, 15.04, 15.05, 15.06, 15.22; 134/166 C, 103.1; 251/151

(56) References Cited

U.S. PATENT DOCUMENTS

| | | |
|---|---|---|
| 2,293,796 A | 8/1942 | Bestor |
| 3,656,711 A | 4/1972 | Toelke |
| 3,712,331 A | 1/1973 | Otto |
| 3,811,462 A | 5/1974 | Feliz |
| 3,897,599 A | 8/1975 | Artzer |
| 4,133,347 A | 1/1979 | Mercer |
| 4,527,295 A | 7/1985 | Lacore |
| 4,550,453 A | 11/1985 | Norman |
| 4,667,351 A | 5/1987 | Williams |
| 4,844,121 A | 7/1989 | Duke |
| 4,846,212 A | 7/1989 | Scobie et al. |
| 4,854,349 A | 8/1989 | Foreman |
| 5,141,017 A | 8/1992 | Trottier |
| 5,206,962 A | 5/1993 | Thorwaldson |
| 5,588,459 A | 12/1996 | Ellis |

Primary Examiner—George L. Walton

(57) ABSTRACT

A connector for an RV sewage holding tank includes a water inlet and a rotatable valve connected thereto. The valve has a plurality of positions and a spherical nozzle on the valve allows manual rotation whereby fresh water can be directed towards the holding tank for cleaning and dislodging debris contained therein. By rotating the nozzle to a rearward direction a stream of water can then be directed towards the sewage line for cleaning and draining debris or the like. The connector is molded from plastic, is lightweight and easy to use without tools or detailed training.

14 Claims, 3 Drawing Sheets

RV HOLDING TANK CONNECTOR AND METHOD

FIELD OF THE INVENTION

The invention herein pertains to connectors for RV sewage holding tanks and particularly pertains to a connector having a fresh water inlet for cleaning and draining the holding tank and sewage line.

DESCRIPTION OF THE PRIOR ART AND OBJECTIVES OF THE INVENTION

Recreational vehicles (RVs), motor homes and the like having bathroom facilities are generally equipped with sewage holding tanks. These tanks are drained from time to time as convenient such as when parked at camping grounds and other facilities providing sewage disposal hook-ups. Normally the RV or camper is parked at a designated space and one end of a flexible sewage line is then attached to the RV holding tank outlet and the other end of the sewage line is attached to the septic tank or other sewage disposal equipment. A valve on the holding tank outlet can then be opened to allow sewage and the like to flow therethrough for removal and drainage purposes.

It is not unusual for sewage holding tank outlets to become partially or fully clogged with paper and debris thereby requiring the owner to perform the unpleasant task of removing the sewage line and attempt to dislodge any obstructions. Further, it is not unusual for RV flexible sewage lines to become clogged or obstructed, again requiring the distasteful task of removing the sewage line and flushing it with fresh water in an effort to clear the same.

For assistance with these problems, various prior art devices such as found in U.S. Pat. Nos. 5,141,017 and 4,133,347 provide back flushing capabilities. U.S. Pat. No. 5,588,459 demonstrates a sewage removal device for use with recreational vehicles having a fresh water inlet. While all the prior art devices can be of help in certain circumstances, problems persist and in this environment the present invention was conceived and one of its objectives is to provide a connector for an RV sewage holding tank outlet which is relatively inexpensive to manufacture and sell and which is easy and convenient to use.

It is another objective of the present invention to provide an RV holding tank connector which includes an inlet for attachment to a fresh water supply.

It is still another objective of the present invention to provide a holding tank connector which includes a rotatable valve for selectively directing the fresh water therethrough.

It is still another objective of the present invention to provide a holding tank connector having a knob joined to the valve nozzle which will allow manual manipulation for directing fresh water in a first direction towards the RV holding tank or in a second direction towards the sewage line for cleaning and drainage purposes.

Various other objectives and advantages of the present invention will become apparent to those skilled in the art as a more detailed description is set forth below.

SUMMARY OF THE INVENTION

The aforesaid and other objectives are realized by providing an RV holding tank connector having a cylindrical housing formed from durable plastic. The housing includes a sewage inlet end with a series of hooks for joining the holding tank outlet and an outlet end having a series of pegs for connection to a flexible RV sewage line. A fresh water inlet on the connector housing includes a receptacle for the threaded male end of a conventional garden hose. Also, a rotatable valve is joined thereto. The valve can be manually rotated to an off position or to a forward position (towards the holding tank) for directing a stream of fresh water, or a rearward position (towards the flexible sewage line) for a stream of fresh water. In the forward direction, water entering the inlet passes through a nozzle aperture towards the RV holding tank in a high velocity stream to dislodge obstructions and/or for cleaning purposes. By rotating the valve 90°, a stream of water is then directed rearwardly, towards the outlet end of the connector for washing debris along the flexible sewage line. After such blockages and cleaning have been satisfactorily completed, the valve can be rotated to its off position. Thus, the holding tank outlet can be impinged with a stream of high velocity water to help dislodge any obstructions and for cleaning the holding tank. Upon 90° rotation, the high velocity stream can be used for cleaning and flushing the flexible sewage line.

DETAILED DESCRIPTION OF THE PREFERRED EMBODIMENT AND OPERATION OF THE INVENTION

Figure 1:
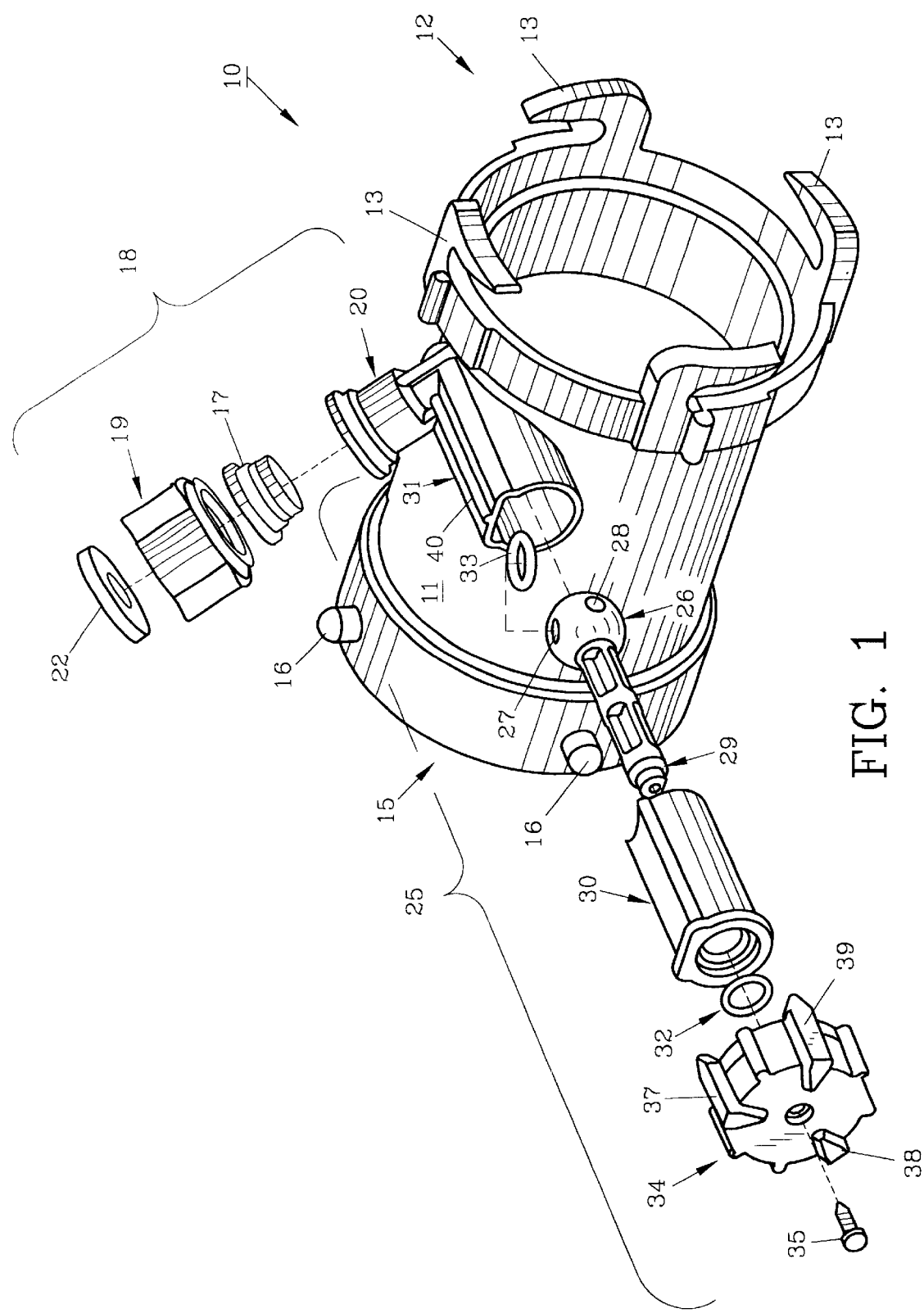
FIG. 1 illustrates a front, top, left side perspective view of the connector of the invention in exploded fashion.
Figure 2:
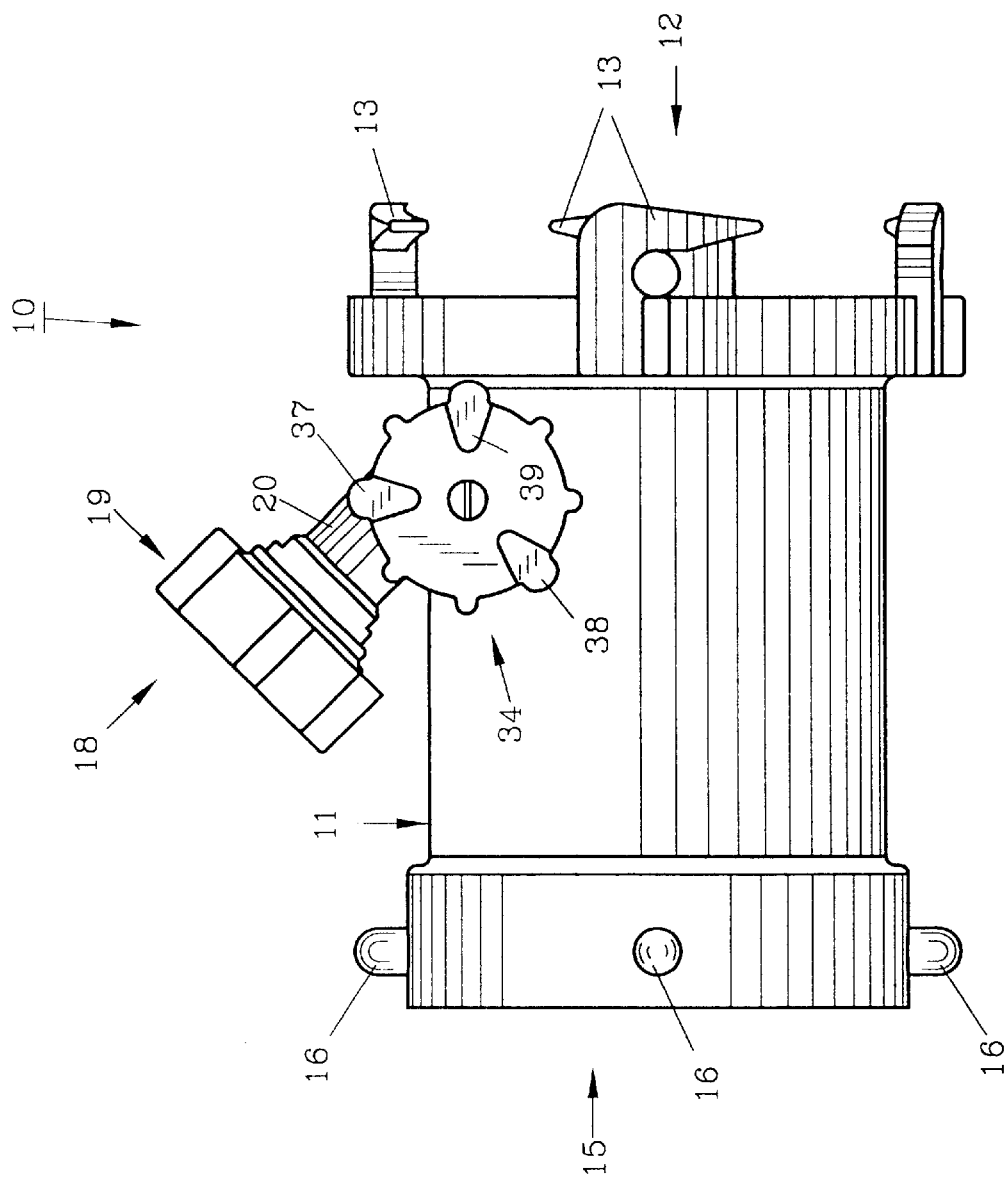
FIG. 2 demonstrates a side elevational view of the connector as shown in FIG. 1 in assembled form.
Figure 4:
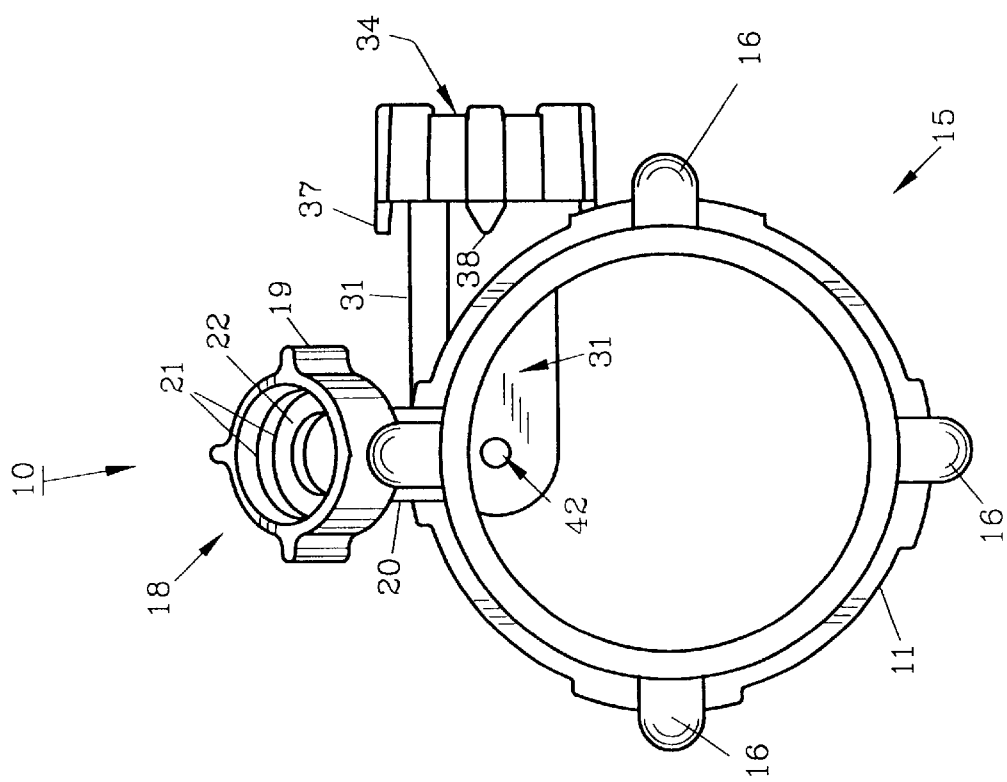
FIG. 4 pictures a rear elevational view of the connector as seen in FIG. 1.

For a better understanding of the invention and its operation, turning now to the drawings, FIGS. 1–4 demonstrate views of the preferred embodiment of sewage line connector 10. As seen in FIG. 1, connector 10 includes housing 11 which is cylindrically shaped and is preferably molded of a polycarbonate although other suitable plastics, metal or other materials may be used. Connector 10 includes sewage inlet end 12 having a plurality of hooks 13 thereon for connecting to a typical RV holding tank outlet. Sewage outlet end 15 as seen in FIG. 4 has a series of pegs 16 for connection to a conventional RV flexible sewage line. Inlet end 12 and outlet end 15 as seen in FIGS. 1 and 2 are in opposing axial alignment. Water inlet 18 which is attached to housing 11 can be easily coupled to the threaded male end of a typical garden hose (not seen) as rotatable cap 19, joined by retainer 17 to inlet stud 20 is provided with interior threads 21 (FIG. 4). Washer 22 insures a waterproof seal when the male end of the garden hose is threadably received by cap 19.

Figure 3:
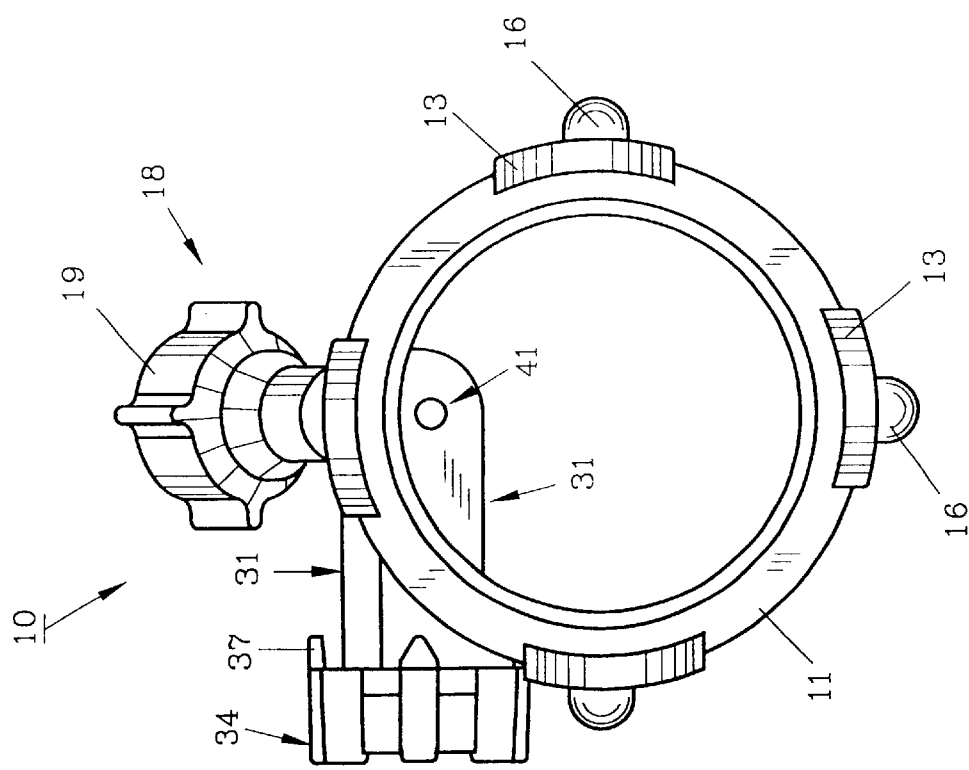
FIG. 3 depicts a front elevational view of the connector as seen in FIG. 1.

Valve 25 shown exploded in FIG. 1 includes spherical nozzle 26 having ports 27, 28, preferably spaced at 90°. Nozzle 26 is joined to stem 29 which is rotatably positioned within inner sleeve 30 when assembled. Inner sleeve 30 is contained within outer sleeve 31 on housing 11 and is in communication with inlet 18. Washers 32, 33 are formed of rubber or other suitable polymeric materials for sealing purposes when valve 25 is assembled as shown in FIGS. 2, 3 and 4. Knob 34 is affixed to the end of valve stem 29 by threaded member 35. Knob 34 includes directional arrows 37, 38 and 39, preferably by molding thereon, and may be marked with letters or the like for help in use. After assembly, arrow 38 can be manually rotated into alignment with ridge 40 on valve outer sleeve 31 to terminate water flow from inlet 18 into housing 11. By so aligning arrow 39, water will pass from inlet 18 through nozzle port 27 and then through housing aperture 42 as shown in FIG. 4 thereby directing water towards outlet end 15 of connector 10 for flushing waste and the like through the flexible sewage hose (not shown). By rotating knob 34 so that arrow 37 is aligned with ridge 40, water passing through inlet 18 will then be directed towards inlet end 12 of connector 10 after passing through nozzle port 28 of nozzle 26 and through housing aperture 41 as seen in FIG. 3. As would be understood, arrow 39 can be aligned to open port 27 of nozzle 26 whereas arrow 37 can be aligned to open port 28 of nozzle 26. Thus, arrows 37, 38 and 39 provide a convenient visual indicator for operating valve 25 of connector 10.

The preferred method of using connector 10 for selectively directing water such as from a garden hose in either a forward direction (towards the RV holding tank) or in a rearward direction (towards the flexible sewage line) for cleaning and maintenance purposes includes the steps of: first attaching connector 10 to the RV holding tank outlet (not shown) provided. Next, the male end of a garden hose is attached to water inlet cap 19 as shown in FIG. 2. The garden hose female end is connected to a usual water line faucet or the like (also not shown) and with water flowing therethrough, is turned off with knob 34 as direction arrow 38 is aligned with ridge 31 on outer sleeve 40 to prevent water from entering nozzle 26. Connector 10 is then joined at outlet end 15 to a flexible sewer line which in turn is joined to a standard sewage system, septic tank or the like. To direct a stream of water through connector 10 towards the RV holding tank, knob 34 is rotated in a counterclockwise direction whereby arrow 37 is aligned with ridge 31 (shown in FIG. 2) to allow water passing through inlet 18 to be directed forwardly, towards the holding tank. This stream of high velocity water will wash and dislodge clogs and debris which it strikes. In order to assist drainage, knob 34 can thereafter be rotated so arrow 39 aligns with ridge 40 on housing 31 whereby a stream of high velocity water is then directed through aperture 42 as shown in FIG. 4 towards outlet end 15 and the flexible sewage line joined connector 10. Thus, by manually, selectively rotating knob 34, sludge, paper and debris can be urged for drainage purposes along and through connector 10 without tools, equipment and disassembly.

The illustrations and examples provided herein are for explanatory purposes and are not intended to limit the scope of the appended claims.

We claim:

1. A connector for a sewage line comprising: a housing, said housing defining a sewage inlet and a sewage outlet, said sewage inlet in axial alignment with said sewage outlet, a fresh water inlet, said fresh water inlet communicating with said housing between said sewage inlet and said sewage outlet to supply fresh water thereto, a rotatable valve, said valve attached to said housing proximate said fresh water inlet, said valve defining a pair of water ports angularly aligned thereon, said valve selectively rotatable to a first position to axially direct water directly inside said housing from one of said ports towards said sewage outlet, said valve rotatable to a second position to axially direct water directly inside said housing through another of said ports towards said sewage inlet whereby fresh water can be used to clean and dislodge debris located at the sewage outlet or at the sewage inlet by said selective valve rotation.

2. The connector of claim 1 wherein said housing is cylindrically shaped.

3. The connector of claim 1 wherein said fresh water inlet is angularly joined to said housing.

4. The connector of claim 1 wherein said rotatable valve is mounted on said fresh water inlet.

5. The connector of claim 1 wherein said rotatable valve comprises a spherical nozzle.

6. The connector of claim 5 wherein said spherical nozzle defines a pair of water ports.

7. The connector of claim 6 wherein said ports are spaced 90° apart.

8. The connector of claim 1 wherein said rotatable valve comprises a nozzle, a stem, said nozzle joined to said stem, a knob, said knob positioned on said stem in opposing relation to allow said knob to rotate said nozzle.

9. A connector for a sewage holding tank comprising: a housing, said housing defining a sewage inlet and a sewage outlet, said sewage inlet and said sewage outlet in axial alignment, said sewage outlet for attachment to a sewer hose and said sewage inlet for attachment to a holding tank, a fresh water inlet, said fresh water inlet for connection to a fresh water supply, a rotatable valve, said valve comprising a stem, a nozzle, said stem attached to said nozzle, said valve positioned proximate said fresh water inlet on said housing, said nozzle defining a plurality of water ports, said water ports angularly aligned, said valve for selective rotation, whereby water passing through said fresh water inlet can be directed axially through one of said ports directly towards said sewage inlet or directed axially through another of said ports directly towards said sewage outlet to clean debris from the sewage inlet or sewage outlet by said selective valve rotation.

10. The connector of claim 1 wherein said connector is formed from plastic.

11. A method of selectively directing water through a connector attached to a sewage holding tank, said connector having a housing with a sewage inlet and a sewage outlet axially aligned and a rotatable valve with a nozzle having a pair of ports, said valve connected to the housing, said method comprising the steps of:

a) selectively rotating the valve in a first direction to allow fresh water to flow through one of said ports directly towards said sewage outlet for cleaning debris therefrom; and b) selectively rotating the valve in a second direction to allow fresh water to flow through the other of said ports directly towards said sewage inlet for cleaning debris therefrom.

12. The method of claim 11 wherein rotating the valve comprises the step of manually rotating the valve to allow fresh water to flow through one of said ports towards the holding tank.

13. The method of claim 11 wherein rotating the valve comprises the step of manually rotating the valve to allow fresh water to flow through one of said ports away from the holding tank.

14. The method of claim 11 wherein rotating the valve comprises the step of manually rotating the valve to an off position.

* * * * *